June 16, 1953    C. A. LAFFOON    2,641,944
HOSE COVERING STRIPPING TOOL
Filed Oct. 19, 1949    2 Sheets-Sheet 1
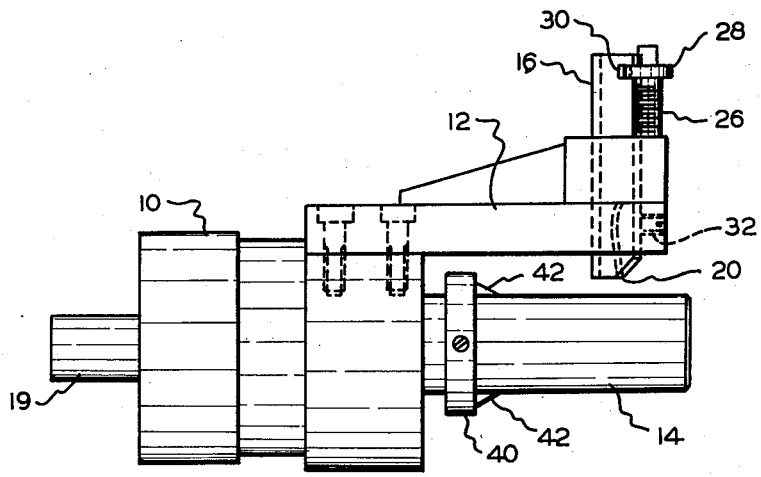
Fig. I.
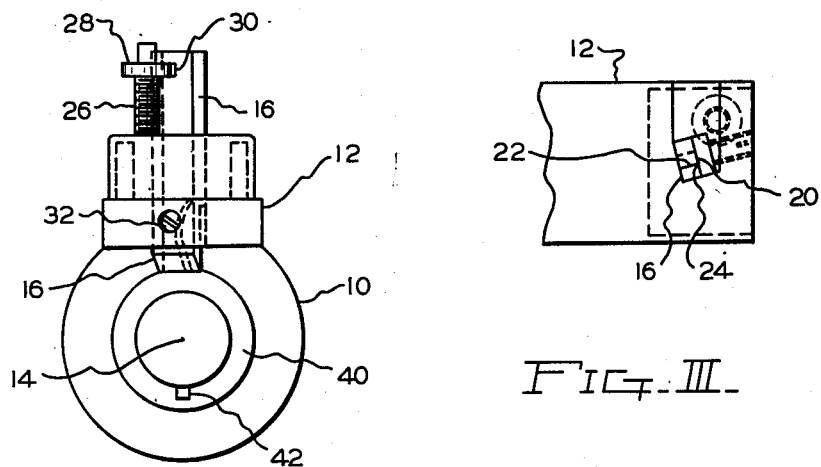
Fig. II.    Fig. III.
INVENTOR
CHARLES A. LAFFOON
BY Beaman and Patch
ATTORNEYS

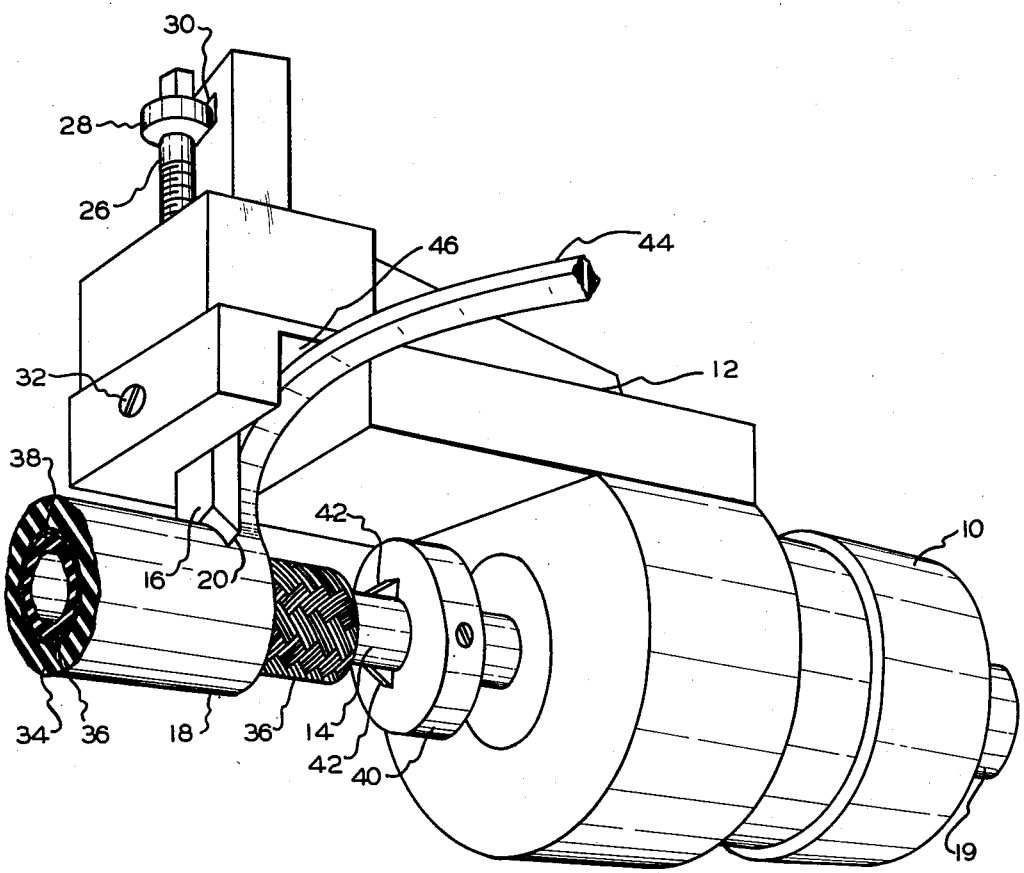
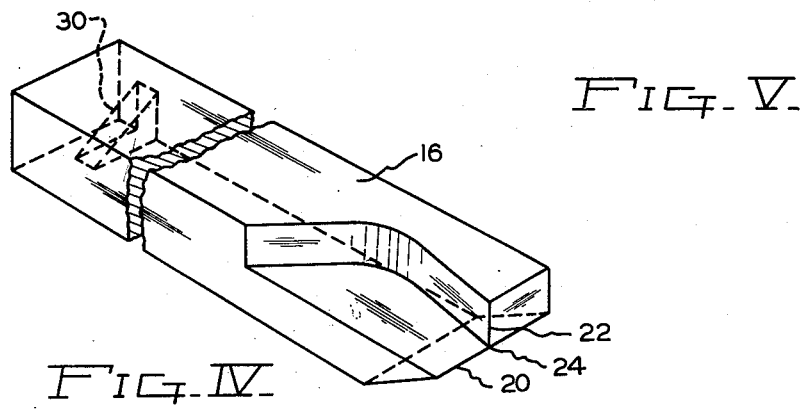

UNITED STATES PATENT OFFICE 2,641,944

HOSE COVERING STRIPPING TOOL

Charles A. Laffoon, Miami, Fla., assignor to Aeroquip Corporation, Jackson, Mich., a corporation of Michigan Application October 19, 1949, Serial No. 122,214

3 Claims. (Cl. 81—9.51)

This invention relates to apparatus for preparing the end portions of flexible hose lines for the attachment of end fittings, the flexible hose comprising an inner metal reinforcement and an outer layer of rubber or rubber-like material which is required to be stripped in order that the reinforcement may be exposed and relied upon to make an effective joint with the applied end fitting.

Hitherto the aforesaid stripping operation has involved grinding the outer hose layer; with the attendant disadvantage that the grinding operation gives rise to dust particles and fumes and necessitates the employment of special and permanent equipment, such as extraction fans, for the protection of the operatives or factory employees.

Thus, it becomes an object of the present invention to provide apparatus by which this stripping operation can be effected without the creation of dust particles and fumes, by the elimination of the known grinding operation and permanent equipment and the employment of a tool which severs and pares the outer layer and is capable of being readily carried about and immediately set-up for use anywhere that a lathe, drill press or like source of rotative power is available to rotate the tool.

The above, and other objects and advantages of the invention will become apparent from a consideration of the following description of one practical form of the invention, given by way of example with reference to the drawings, and defined in the appended claims.

In the drawings:

Fig. I is a side elevational view of one form of apparatus in accordance with the invention, Fig. II is a right-hand end view of Fig. I, Fig. III is a fragmentary plan view of Fig. I, looking down upon the combination cutting and paring tool, Fig. IV is a fragmentary view of the said tool, and Fig. V is a perspective view illustrating the operational use of the apparatus.

Referring to the drawings, the apparatus comprises a body portion 10, in the form of a boss, upon which there is carried an overhead bracket 12 and a co-axial rotary mandrel 14, the bracket serving to support a combination cutting and parting tool 16 and the mandrel, which is rotatably mounted in the body part 10, serving to receive and locate the end portion of a hose 18 (Fig. V) telescopically received upon the mandrel. The body part 10 also incorporates a shank 19 by which the apparatus can be mounted as a unit upon a lathe or drill press so that the cutting tool may be held positioned against the outer hose layer and the mandrel be rotated.

The tool 16 is vertically mounted upon the bracket 12 and at its lower end is formed with two cutting edges 20 and 22 perpendicular to each other and having a junction point 24 disposed upon the center line of the mandrel and hence of the hose, the cutting tool being so formed and mounted that its cutting edges are inclined to the said center line, as appears from consideration of Fig. III.

The tool is vertically adjustable, as by manipulation of the adjustment screw 26, having a collar 28 engaged in a notch 30 in the tool, and the set screw 32, whereby the tool can be accurately and variably adjusted to cut to depth into the outer layer of the hose, the latter having the outer rubber or rubber-like layer 34 (Fig. V), an internal braid reinforcement 36 and an inner layer 38.

The mandrel carries a stop ring 40, adjustable along the mandrel, and serving to arrest traversal movement of the hose along the mandrel, as well as to carry a chamfering tool 42 (Fig. V), this tool being positioned to engage the end edge of the bared reinforcement and the inner hose layer presented to the stop ring at the end of such traversal movement. When this happens, the tool 42 operates to chamfer, or bevel, the said end edge and thereby render the same more suitable for the attachment of the end fitting (not shown).

In operation, with the apparatus set-up on a lathe or drill press and the mandrel rotated thereby, the operator telescopes the hose upon the mandrel to enter the hose into engagement with the tool 16. The resulting traversal movement of the hose, combined with the angular setting of the tool 16, causes the outer hose layer 34 to be cut to depth with a helical cut by the cutting edge 20 and pared from the reinforcement 36 by the immediately following paring edge 22, the outer hose layer being removed in the form of a strip 44, as shown in Fig. V, where the underside of the bracket 12 is shown recessed at 46 to clear and direct the strip for ultimate rejection. Upon the stripped hose end arriving at the stop ring 40 its traversal motion is arrested, so continued rotation of the hose at this point results in formation of a circular cut which severs the strip 46 and frees the same for rejection.

At the same time the chamfering tool 42 operates to chamfer, or bevel, the stripped hose end around its peripheral edge.

Adjustment of the stop ring 40 along the mandrel permits the length of the stripped hose end to be varied to suit particular requirements, which adjustment, in conjunction with the vertical adjustment of the tool 16 permits the apparatus to be set to operate upon different hose diameters for the reception of correspondingly different size end fittings.

Having thus described my invention in one practical form and operation thereof, what I claim as novel and wish to secure by Letters Patent is as follows:

1. Apparatus for removing an outer layer from the material of an end portion of a length of flexible hose comprising in combination a rotatable body structure, a mandrel on said body structure, coaxial with the axis of rotation of the body structure, said structure including a tool holder, a cutting tool mounted in said holder in perpendicular relationship to said axis, said tool having in an integral structure a leading cutting edge for cutting radially into the hose material and having also a trailing cutting edge for cutting axially into the material to peel the radially cut material from the hose, and means for adjusting said tool on its holder to adjust the depth of radial cut.

2. Apparatus as claimed in claim 1, said mandrel having an outwardly extending radial flange at one end forming a stop for arresting axial movement of the hose upon the mandrel.

3. Apparatus as claimed in claim 1, said mandrel having an outwardly extending radial flange at one end forming a stop for arresting axial movement of the hose upon the mandrel, said mandrel having bevelled cutter means adjacent the flange for bevelling the end of the hose presented to said stop.

CHARLES A. LAFFOON.

References Cited in the file of this patent

UNITED STATES PATENTS

| Number | Name | Date |
|---|---|---|
| 72,436 | Wippo | Dec. 17, 1867 |
| 1,841,550 | Parker | Jan. 19, 1932 |
| 1,860,846 | Watt | May 31, 1932 |
| 2,330,242 | Romero | Sept. 28, 1943 |

FOREIGN PATENTS

| Number | Country | Date |
|---|---|---|
| 102,328 | Germany | Apr. 10, 1899 |